United States Patent [19]

Haines et al.

[11] Patent Number: 5,025,383

[45] Date of Patent: Jun. 18, 1991

[54] POSTAGE METER TRANSPARENT I/O INTERFACE

[75] Inventors: John G. Haines, Oakland; Nolan G. Rosenbaum, Hayward; Albert L. Pion, Berkeley, all of Calif.; Marc Lecarpentier, Antony; Christophe Henriot, Crepy en Valois, both of France; Cyrus Abumehdi, Harlow, England

[73] Assignee: FME Corporation, Hayward, Calif.

[21] Appl. No.: 534,013

[22] Filed: Jun. 5, 1990

Related U.S. Application Data

[63] Continuation of Ser. No. 146,919, Jan. 22, 1988, abandoned.

[51] Int. Cl.[5] .............................................. G06F 15/20

[52] U.S. Cl. ............................... 364/464.03; 364/200; 364/242.5

[58] Field of Search ................... 364/466, 464.03, 478, 364/200, 900; 235/462; 53/502; 318/685

[56] References Cited

U.S. PATENT DOCUMENTS

| | | | |
|---|---|---|---|
| 4,286,325 | 8/1981 | Dlugos et al. | 364/464.03 |
| 4,395,756 | 7/1983 | Daniels | 364/200 |
| 4,410,961 | 10/1983 | Dlugos et al. | 364/466 |
| 4,410,962 | 10/1983 | Daniels et al. | 364/464.03 |
| 4,466,079 | 8/1984 | Daniels et al. | 364/464.03 |
| 4,481,587 | 11/1984 | Daniels, Jr. | 364/464.03 |
| 4,509,113 | 4/1985 | Heath | 364/200 |
| 4,538,224 | 8/1985 | Peterson | 364/200 |
| 4,545,015 | 10/1985 | Baunach | 364/200 |
| 4,574,352 | 3/1986 | Coppola et al. | 364/466 |

*Primary Examiner*—Joseph L. Dixon

*Attorney, Agent, or Firm*—Townsend and Townsend

[57] ABSTRACT

An electronic postage meter with memory and a postage printing function having enhanced I/O capability. The meter, in addition to its normal mode of operation, has a transparent mode of operation wherein the meter keyboard and display can be utilized as a user interface to an external I/O device. During the transparent mode of operation, the meter maintains control and security over the meter memory and print function.

9 Claims, 2 Drawing Sheets

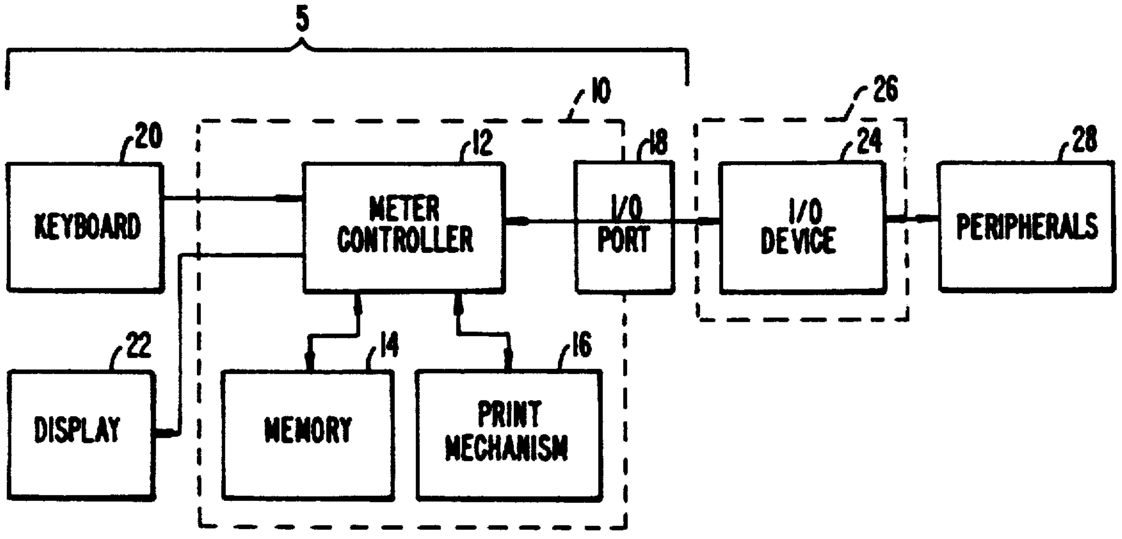
FIG._1. PRIOR ART (NORMAL MODE)
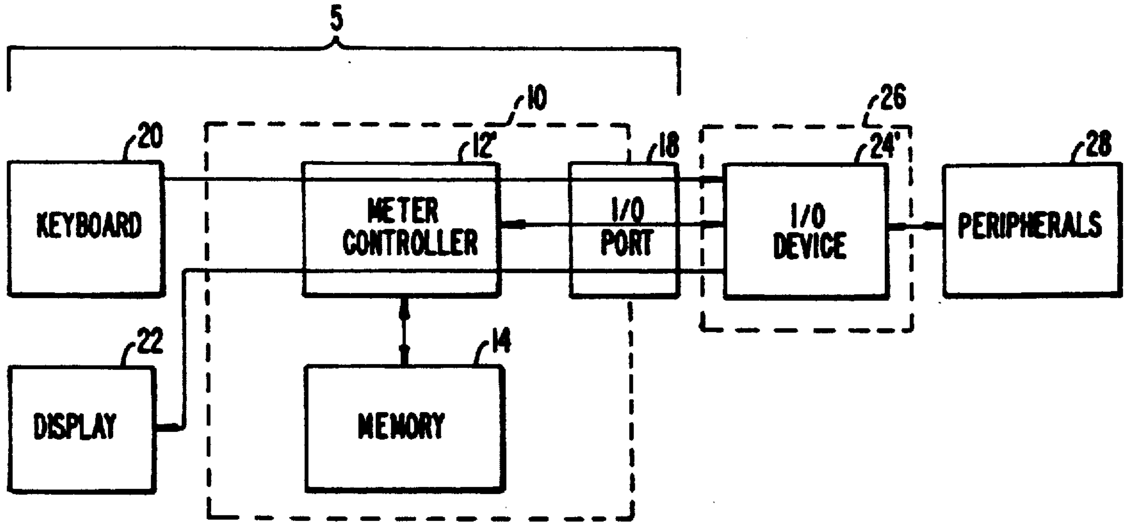
FIG._2. TRANSPARENT MODE

POSTAGE METER TRANSPARENT I/O INTERFACE

This is a continuation of application Ser. No. 146,919, filed Jan. 22, 1988, now abandoned.

BACKGROUND OF THE INVENTION

Postage meters (hereinafter called "meters") are well known devices for printing postage impressions of desired value. A meter generally has a set of registers, a print mechanism, and a controlling mechanism. The controlling mechanism acts to interlock the print mechanism and registers to ensure that all postage printed is accounted for. The registers, the print mechanism, and the meter controller are enclosed within a secure housing so as to be inaccessible to the user.

In modern electronic meters, the controlling mechanism is a microprocessor (hereinafter called "meter controller") and the registers are implemented as locations in random access memory (hereinafter called "meter memory"). The meter memory can be expanded to include accounting, cost allocation, or non-revenue information. External and permanently affixed to the housing is a keyboard for data entry to the meter controller and a display for data output to the user. In addition, an input/output port (hereinafter called "I/O port") may be provided so the meter controller can communicate with external devices. Many prior security measures are retained or improved. For example, the meter housing is still utilized to maintain physical security. The meter controller may utilize new techniques unique to electronic equipment to increase security for the meter memory.

In a typical configuration the meter is placed on a base from which it derives power. The base performs envelope handling and similar functions, and may include an input/output facility (hereinafter called "I/O device"). The I/O device can communicate with the meter through the meter's I/O port. The I/O device can also communicate with other peripherals external to the base such as scales and printers. For example, a scale may be used to weigh an article, calculate the cost of sending the article through the mail, and send that cost to the I/O device. The I/O device then tells the meter the denomination of postage to print. A user can also use an external user interface, such as the keyboard and display on a scale, to command the I/O device to generate a preprogrammed report. The I/O device then queries the meter for certain accounting or non-revenue information contained in the meter memory, formats that information, then commands a printer to print the report. However, in each case the meter does not initiate any commands to the I/O device, the meter merely responds to commands from the I/O device.

SUMMARY OF THE INVENTION

The present invention is an electronic postage meter having enhanced I/O capability. This is achieved by providing the meter, in addition to its normal mode of operation, a so-called "transparent" mode of operation wherein the keyboard and display can be utilized as a user interface to the I/O device. In the transparent mode of operation, the meter controller determines whether a key press sequence on the keyboard has occurred, generates a command describing the key press sequence, then transmits that command through the I/O port to the I/O device. In addition, the I/O device can command the meter controller to put data onto the display. As a result, the user is able to communicate directly with the I/O device without requiring additional peripheral equipment.

In a preferred embodiment, when the meter in the normal mode sees an unknown key press sequence, it automatically generates a command describing the key press sequence and transmits that command to the I/O device. If the key press sequence is unknown to the I/O device, it is ignored, otherwise the I/O device will perform the command. As a result, limited communication with the I/O device is available to the user when the meter is in the normal mode. It is through this process that the user can use the keyboard to tell the I/O device to command the meter to enter the transparent mode.

While in the transparent mode, any key press sequence on the keyboard is passed directly to the I/O device by the meter controller. In addition, the display shows only data which the I/O device commands the meter to put on the display. The meter does not respond to the contents of the keyboard entries nor does it generate data to put on the display.

Because the keyboard and display are not under the control of the meter, the user is unable to control the meter printing function. The meter does not respond to the keyboard entries and the display does not tell the user what printing functions are occurring. Therefore, with current applications, meter printing is disabled when the meter is in the transparent mode. However, future applications may allow the I/O device to actuate the primary function under the control and security of the meter controller.

In order to go from the transparent mode back to the normal mode, the user merely enters a predetermined command on the keyboard which is passed by the meter controller to the I/O device. The I/O device then commands the meter to return to the normal mode of operation. The meter also returns to the normal mode if it is powered down, then powered up again. However, if the I/O device is still in communication with the meter, it may command the meter to return to the transparent mode.

The above functions require changes to the protocol between the meter controller and the I/O device. The meter controller can now initiate communication with the status command and with commands describing what keys have been pressed by the user. In addition, the I/O device has new commands including commanding the meter controller to put certain data on the display.

Security is maintained in the transparent mode because the meter controller maintains control of communications between the meter memory and the I/O device thereby protecting the meter memory from unauthorized access or use. In addition, the meter controller does not respond to the keyboard entries because if the meter controller responded to both the keyboard entries and the I/O device, potential conflicts could occur. Furthermore, the printing function is disabled with current applications to maintain security and prevent user confusion.

A further understanding of the nature and advantages of the present invention can be realized by reference to the remaining portions of the specification and attached drawings.

BRIEF DESCRIPTION OF THE DRAWINGS

FIG. 1 is a block diagram showing a prior art or normal mode configuration of the meter in communication with external devices; and FIG. 2 schematically shows the meter in communication with external devices while the meter is in the transparent mode.

DETAILED DESCRIPTION OF THE PREFERRED EMBODIMENT

Figure 3:
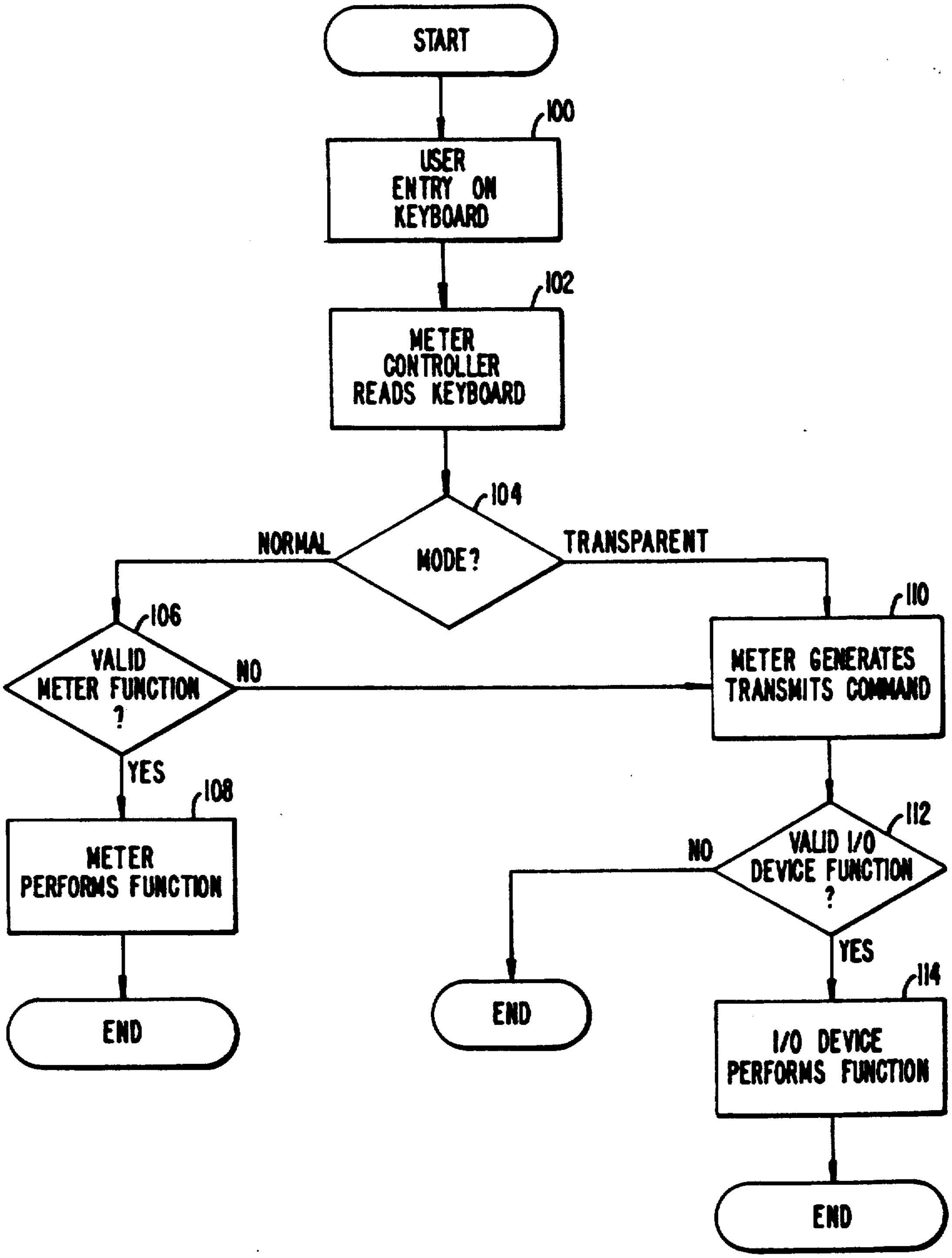
FIG. 3 is a flow chart showing user communication with the meter controller and the I/O device through the keyboard.

FIG. 1 is a block diagram showing a prior art or normal mode configuration of a meter in communication with external devices.

A meter 5 includes a secure meter housing 10 in which are located a meter controller 12, a meter memory 14, a print mechanism 16, and an I/O port 18. The meter controller communicates directly with each of the devices located in the housing and with a keyboard 20 and a display 22 that are external to the housing. Meter controller 12 controls the actions of and maintains the security for the devices located in the housing. The meter controller also communicates through the I/O port to an I/O device 24 located in a meter base 26. The I/O device communicates directly with one or more peripheral devices 28 such as scales, printers, modems, computers, and the like.

The meter controller communicates with the user through the keyboard and display, and can respond to commands from the I/O board. However, the meter cannot initiate commands to the I/O board. The I/O board communicates with the user through one of the peripheral devices.

FIG. 2 schematically shows the meter in communication with external devices while the meter is in the transparent mode. Reference numbers corresponding to FIG. 1 will be used.

A modified meter controller 12' continues to control the actions of and maintain the security for the meter memory 14, print mechanism 16, and I/O device 18 located in the secure housing 10. The printing mechanism has been disabled and is not known.

The meter controller determines whether a key press sequence on the keyboard 20 has occurred, generates a command describing the key press sequence, and transmits that command through the I/O port 18 to a modified I/O device 24'. The I/O device can command the meter controller to put data on the display 22. As a result, the user is able to communicate directly with the I/O device. In addition, the meter controller does not respond to the key entries nor does it generate data to put on the display.

FIG. 3 is a flow chart showing user communication with the meter controller and the I/O device through the keyboard.

The user enters a key press sequence on the keyboard (100). The meter controller reads the key press sequence by scanning the keyboard (102). The meter controller then checks a software switch to determine whether the meter is in the normal mode or transparent mode (104). If the meter is in the normal mode, the meter controller looks at a function table in memory to determine whether the key press sequence references a valid meter function (106). If the key press sequence does describe a valid meter function, then the meter performs the function (108). Examples of valid meter functions include printing postage, displaying some data contained in memory, etc.

If the meter is in the transparent mode or if the key press sequence is not a valid meter function, then the meter generates a command describing the key press sequence and transmits that command to the I/O device (110). The command includes an opcode and a variable length data field. In this case, the opcode states that the command is describing a key press sequence. The data field describes the key press sequence. The I/O device then determines whether the key press sequence references a valid I/O device function (112). If the key press sequence does reference a valid function, the I/O device performs that function (114).

The user is able to utilize this process to tell the I/O device to command the meter to go into the transparent mode. In the present embodiment, the user presses *1 on the keyboard while the meter is in normal mode. Because *1 does not reference a valid meter function, the meter controller generates a command describing the *1 key press sequence and transmits the command to the I/O device. The I/O device recognizes the *1 sequence as a command to cause the meter to go into transparent mode. The I/O device then generates a command instructing the meter to go into the transparent mode and transmits that command to the meter controller. The meter controller then causes the meter to go into the transparent mode, then passes a command back to the I/O device telling it whether the change to transparent mode was successful.

What is claimed is:

1. In a postage meter having first input means for entering data, first output means for displaying data, means for printing postage, means for storing data, second input means for entering data from external devices, second output means for writing data to external devices, and a meter controller electrically connected to each of the aforesaid means and programmed for processing data and for controlling the operation of the postage meter, the improvement wherein the meter controller comprises:

mode means, having two states, for defining two modes for the meter, designated a normal mode and a transparent mode;

first means, responsive to the mode means and responsive to data entered on the first input means for (a) directing meter operation in response to data representing a valid meter function when the meter is in the normal mode, (b) transferring data not representing a valid meter function to the second output means without directing meter operation when the meter is in the normal mode, and (c) transferring all data entered on the first input means to the second output means without directing meter operation when the meter is in the transparent mode; and second means, responsive to the mode means and responsive to data entered on the second input means for transferring at least some data entered on the second input means to the first output means without directing meter operation when the meter is in the transparent mode.

2. The improvement of claim 1, wherein the second means is responsive to at least some data on the second input means, such data specifying changing the state of said mode means.

3. The improvement of claim 2, wherein the means for printing postage is disabled when the meter is in the transparent mode.

4. The improvement of claim 1, wherein the meter controller includes a microprocessor.

5. The improvement of claim 1, and further comprising:

means, responsive to at least some data entered on the second input means, for changing the state of the mode means.

6. In a postage meter having a keyboard, a display, a print mechanism, a meter memory, an input port for entering data from external devices, an output port for writing data to external devices, and a meter microprocessor electrically connected to the keyboard, display, postage printer mechanism, meter memory, input port, and output port, programmed for processing data and for controlling the operation of the postage meter, the improvement wherein the meter microprocessor comprises:

mode means, having two states, for defining two modes for the meter, designated a normal mode and a transparent mode;

means, responsive to the meter being in the normal mode, for directing meter operation in response to keyboard data representing a valid meter function and for transferring keyboard data not representing a valid meter function to the output port without directing meter operation;

means, responsive to the meter's being in the transparent mode, for transferring all keyboard data to the output port without directing meter operation and for transferring at least some data entered on the input port to the display without directing meter operation; and means, responsive to at least one command from the input port for changing the state of said mode means.

7. The improvement of claim 6 wherein the meter controller includes a microprocessor.

8. In the operation of a system having a postage meter and at least one external device, the postage meter having a keyboard, a display, a mechanism for printing postage, meter memory, an I/O port, and a meter controller coupled to each of the foregoing postage meter elements for processing data and controlling the operation of the postage meter, the method comprising the steps, performed by the meter controller, of:

detecting an entry on the keyboard;

determining whether the meter is in a normal mode or a transparent mode;

if the meter is in the normal mode, determining whether the keyboard entry represents a valid meter function, and (a) if the keyboard entry does represent a valid meter function, performing the function, and (b) if the keyboard entry does not represent a valid meter function, communicating the keyboard entry to the I/O port; and if the meter is in the transparent mode, communicating the keyboard entry to the I/O port.

9. The method of claim 8, and further comprising the steps, carried out by the external device, of determining whether the command at the I/O port represents a valid external device function, and if so, performing such function.

* * * * *